O. C. RIXSON.
SELF LOCKING SCREW.
APPLICATION FILED FEB. 20, 1919.

1,310,213.

Patented July 15, 1919.

INVENTOR
Oscar C. Rixson
BY
Rosenbaum Stockbridge & Borst
ATTORNEYS

UNITED STATES PATENT OFFICE.

OSCAR C. RIXSON, OF NEW ROCHELLE, NEW YORK.

SELF-LOCKING SCREW.

1,310,213. Specification of Letters Patent. Patented July 15, 1919.

Application filed February 20, 1919. Serial No. 278,192.

*To all whom it may concern:*

Be it known that I, OSCAR C. RIXSON, a citizen of the United States, residing at New Rochelle, in the county of Westchester and State of New York, have invented certain new and useful Improvements in Self-Locking Screws, of which the following is a full, clear, and exact description.

This invention relates to self-locking screws, the object being to provide a device of this kind for special purposes which will be efficient and of reasonable cost.

My improvement will be described in connection with the accompanying drawings and the features thereof pointed out in the appended claims.

Figure 1:
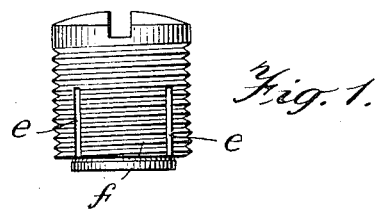
Figure 1 is a side elevation of the improved screw.
Figure 4:
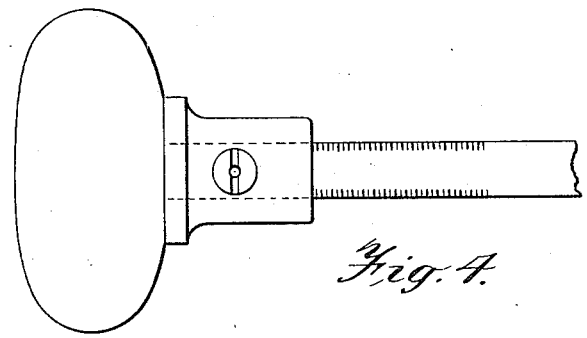
Fig. 4 illustrates the special application of the screw.
Figure 2:
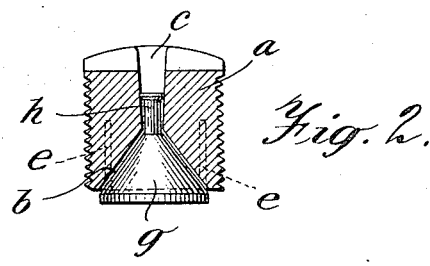
Fig. 2 is a longitudinal central section thereof.
Figure 3:
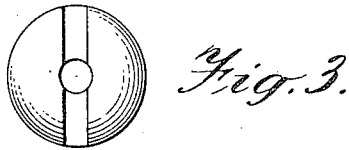
Fig. 3 is a plan of the rear end of the screw.

The screw is specially designed to fasten a door knob upon the end of the knob spindle. In a well known construction of door knob and spindle, the latter is a square rod having its ends screw-threaded, the threads being cut into the corners only of the rod. This spindle screws into the hub of the knob and when properly positioned therein, it is customary to use a set screw which passes radially through the hub and bears against one of the flat faces of the spindle to prevent relative rotation of the knob and spindle. The continual manipulation of the knob causes an ordinary set screw to back out and release the knob, this fact giving rise to considerable annoyance. On account of the conditions of use it has been found difficult to provide any means for holding the set screw in place when once set up, and such means is the object of my invention. The assembly of the knob, spindle and set screw, as used, is shown in Fig. 4. These set screws are short and of comparatively great diameter, being threaded externally from end to end and having straight sides, a flat inner end and the outer end provided with the usual cut for the screw-driver. I provide such a screw with an axial passage which extends from end to end of the screw, the inner end of said passage having outwardly diverging walls to form a conical chamber, while the outer end of said passage is slightly tapered in the opposite direction, being narrowest at the point where it joins the conical portion, and widest at the outer face of the screw. The screw body is indicated by $a$, the inner conical part of the passage by $b$, and the outer tapered portion by $c$. The forward end of the screw which surrounds the conical cavity $b$ is made radially expansible in some manner, preferably by slitting it, as indicated at $e$ longitudinally, the slits extending from the exterior surface of the screw into the conical cavity and forming a number of legs $f$, which will yield outwardly to a force applied radially to the inner surfaces of the wall of the cavity. Within the chamber of the screw I locate a plug comprising a conical portion $g$ and a stem $h$, which latter leads axially from the apex of the conical part. The cone $g$ occupies the conical chamber in the screw and the stem $h$ projects into the tapered passage $c$ to a suitable distance. The base of the conical portion $g$ extends slightly beyond the end of the screw and the outer end of the stem $h$ is upset or headed slightly by means of a punch passed into the passage $c$, to prevent it from falling through the narrowest portion of the passage $c$, the plug thus becoming permanently attached to the screw while being permitted to move slightly relatively thereto. It will be seen that when this set screw is screwed into place so that it will bear against an abutment such as the spindle of the door knob, the base of the cone $g$ in coming into contact with the abutment will be forced into the conical opening $b$ of the screw, causing the two coöperating conical surfaces of the screw and plug, respectively, to act as a wedge and cause the front end of the screw to expand and bear tightly against the threaded wall of the opening occupied by the screw, to hold the latter firmly in place. The farther the screw is forced inward the tighter will be the grip of the external threads. Likewise, the pressure of the spindle against the base of the cone when the knob is turned will tend to increase the grip of the screw and the better hold it in place.

Obviously my invention is not confined to the particular construction or shape of the wedging surfaces between the screw and the plug since this may be modified in various ways so long as a wedging action is obtained. Since the plug and screw are permanently united, the screw can be handled and used in exactly the same manner as an ordinary solid screw, no manipulation being required to bring the parts together or to effect the desired locking.

I claim:

1. A self locking screw having an expansible forward end and provided with a conical cavity in said end, a conical plug fitting said cavity and permanently located therein and having a limited movement therein in two directions with respect to the screw to expand and release respectively the forward end of the screw.

2. A screw having an expansible forward end and a conical cavity therein with an axial passage leading from the apex of said cavity, a conical wedge occupying said cavity and having a neck entering said passage and freely movable in the latter.

3. A screw having an expansible forward end and an axial passage divided into two parts by a restriction, said parts having walls inclined in opposite directions, a wedge occupying one part of the passage and a neck projecting from the wedge occupying the other part of the passage, the neck having a head which will not pass the restriction.

4. A screw having an expansible forward end and provided with an axial passage extending throughout its length, the inner and outer ends of the passage being tapered in opposite directions in combination with a movable tapered plug occupying one end of said passage and provided with a headed stem occupying the other end of said passage whereby the plug is permanently attached to the screw.

In witness whereof I subscribe my signature.

OSCAR C. RIXSON.